(12) United States Patent
Goldwitz

(10) Patent No.: US 12,370,956 B2
(45) Date of Patent: Jul. 29, 2025

(54) DEVICE THAT CAN BE A VEHICLE BED EXTENDER AS WELL AS A TRUNK

(71) Applicant: Brian Goldwitz, Waterbury, CT (US)

(72) Inventor: Brian Goldwitz, Waterbury, CT (US)

( * ) Notice: Subject to any disclaimer, the term of this patent is extended or adjusted under 35 U.S.C. 154(b) by 0 days.

(21) Appl. No.: 18/621,764

(22) Filed: Mar. 29, 2024

(65) Prior Publication Data

US 2024/0326703 A1    Oct. 3, 2024

Related U.S. Application Data

(60) Provisional application No. 63/455,260, filed on Mar. 29, 2023.

(51) Int. Cl.
*B60R 9/06*    (2006.01)

(52) U.S. Cl.
CPC ..................... *B60R 9/06* (2013.01)

(58) Field of Classification Search
CPC ........................................................ B60R 9/06
See application file for complete search history.

(56) References Cited

U.S. PATENT DOCUMENTS

| | | | | |
|---|---|---|---|---|
| 4,215,896 A * | 8/1980 | Drouin | ..................... | B60R 11/06 224/404 |
| 4,938,398 A * | 7/1990 | Hallsen | ..................... | B60R 9/00 224/543 |
| 5,207,469 A * | 5/1993 | Rossi | ..................... | B60R 9/00 224/543 |
| 5,232,259 A * | 8/1993 | Booker | ..................... | B60R 11/06 224/543 |
| 5,853,116 A * | 12/1998 | Schreiner | ..................... | B60R 9/00 224/404 |
| D430,103 S * | 8/2000 | Scudder | ..................... | D12/414.1 |
| 6,174,012 B1 * | 1/2001 | Saffold | ..................... | B60R 9/00 224/404 |
| 6,179,360 B1 * | 1/2001 | Davian | ..................... | B62D 33/033 296/26.11 |
| 6,216,899 B1 * | 4/2001 | Vicari | ..................... | B65D 19/16 206/600 |
| 6,325,448 B1 * | 12/2001 | Estrada | ..................... | B60R 11/06 296/180.1 |
| 6,561,560 B2 * | 5/2003 | Brown | ..................... | B62D 33/0273 296/26.11 |
| 7,226,100 B1 * | 6/2007 | Willey | ..................... | B62D 33/03 296/26.11 |

(Continued)

FOREIGN PATENT DOCUMENTS

RU    192054 U1 *   9/2019

OTHER PUBLICATIONS

RU-192054-U1; Sep. 2, 2019; Ru; Alekseev G V (Year: 2019).*

(Continued)

*Primary Examiner* — Nathan J Newhouse
*Assistant Examiner* — Lester L Vanterpool
(74) *Attorney, Agent, or Firm* — Furr Law Firm; Jeffrey M. Furr

(57) ABSTRACT

The current invention is a device that can be a trunk that can be converted into a bed extender. It can be placed in the bed of the vehicle. It can be comprised of a plurality of molle boards, boards that cover the molle boards, two sides, a hinged top, a bottom, a front, a back and a pivot pen. The current invention can also have shelves.

13 Claims, 18 Drawing Sheets

(56) References Cited

U.S. PATENT DOCUMENTS

| | | | | |
|---|---|---|---|---|
| 8,281,967 | B2* | 10/2012 | Evans | B60R 9/00 |
| | | | | 224/543 |
| 8,408,626 | B1* | 4/2013 | Herndon | B60R 5/042 |
| | | | | 296/180.1 |
| 9,120,594 | B2* | 9/2015 | Huang | B65D 11/1873 |
| 9,132,786 | B2* | 9/2015 | Roach | B60R 9/065 |
| D755,707 | S * | 5/2016 | Roach | D12/414.1 |
| 10,399,501 | B2* | 9/2019 | Flores Marin | B60R 7/02 |
| 11,597,325 | B2* | 3/2023 | Huggett | B60R 7/02 |
| 2010/0283280 | A1* | 11/2010 | Kohlstrand | B60R 5/041 |
| | | | | 296/180.1 |
| 2012/0181810 | A1* | 7/2012 | Alvarino | B60R 13/01 |
| | | | | 296/37.6 |
| 2013/0284780 | A1* | 10/2013 | Beckwith | B60R 7/14 |
| | | | | 224/401 |
| 2014/0175137 | A1* | 6/2014 | Roach | B60P 7/0892 |
| | | | | 224/404 |

OTHER PUBLICATIONS

RU-192054-U1; Sep. 2, 2019; Ru; Alekseev G V (Year: 2019) (Year: 2019).*
RU192054U1; "Lodgment" 2Alekseev G. V.; 019-09-02 (Year: 2019)*

* cited by examiner

DEVICE THAT CAN BE A VEHICLE BED EXTENDER AS WELL AS A TRUNK

RELATED APPLICATIONS

It is a non-provisional of provisional application 63/455,260 filed Mar. 29, 2023 and claims its priority date.

TECHNICAL FIELD

The technology discussed below relates to a vehicle bed extender and more particularly one that can also be used as a trunk.

BACKGROUND

People need with pickups, SUVs and jeeps sometimes need a trunk to store and transport goods while driving their SUV ("Sports Utility Vehicle") such as a Bronco® and sometimes they need a bed extender or trunk to add to storage capacity. The current art does not allow a device to serve as both a trunk and a bed extender.

There is still room for improvement in the art.

SUMMARY

The current invention is a bed extenders that can be also used as a free-standing trunk for pickup truck, SUV and similar vehicles. It can be placed in the bed of the vehicle. It can be comprised of a plurality of molle boards, boards that cover the molle boards, sides, a hinged panel, a bottom, a front, a back and a pivot pen. The current invention can also have shelves.

These are improvements over the current art.

DRAWINGS

Figure 26:
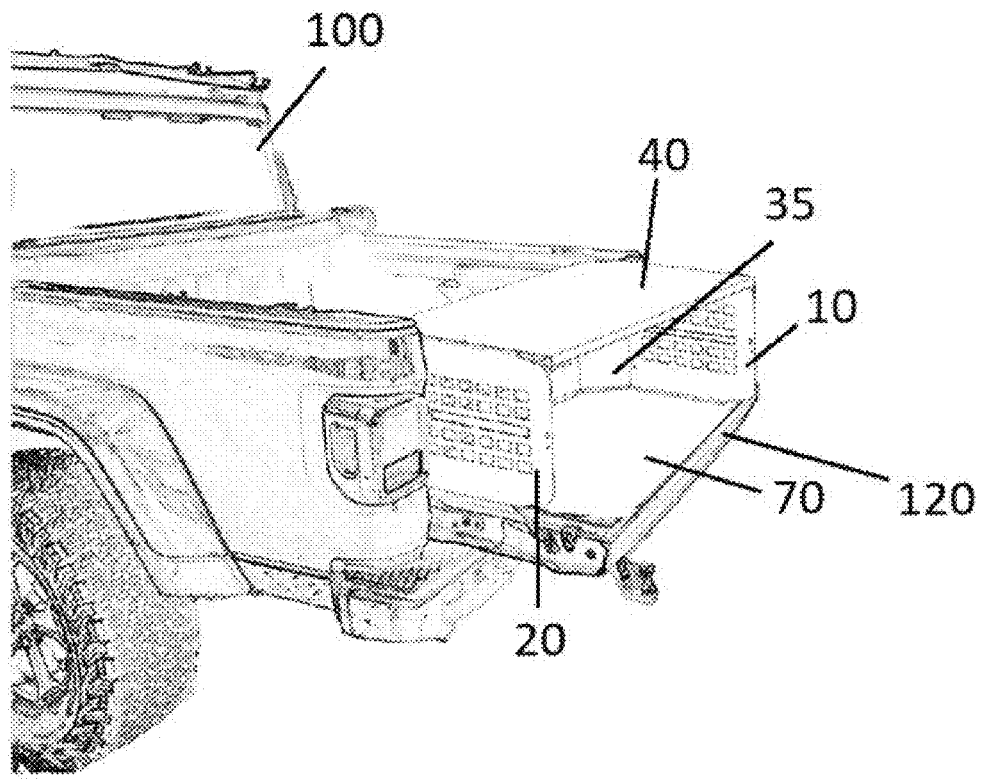
Figure 27:
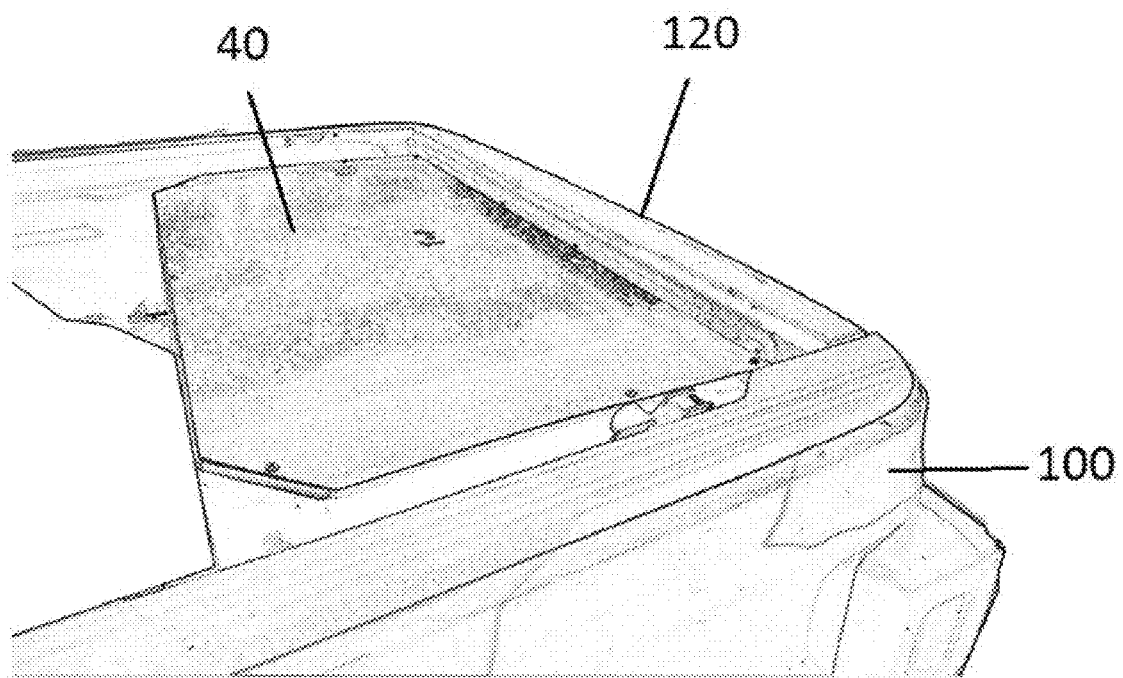

FIG. 26 the slot on the device that can be used to position the device from a trunk to a bed extender; and FIG. 27 shows the device being used as trunk with a hinged lid.

DETAILED DESCRIPTION

The illustrations presented herein are, in some instances, not actual views of any particular framing devices or components thereof but may be idealized representations which are employed to describe the present disclosure. Additionally, elements common between figures may retain the same numerical designation.

The current invention is a device that is an improved bed extender 1 that can be also used as a free-standing trunk as shown in FIGS. 1 through 27. The bed extender 1 is rectangular in shape in the preferred embodiment.

Figure 1:
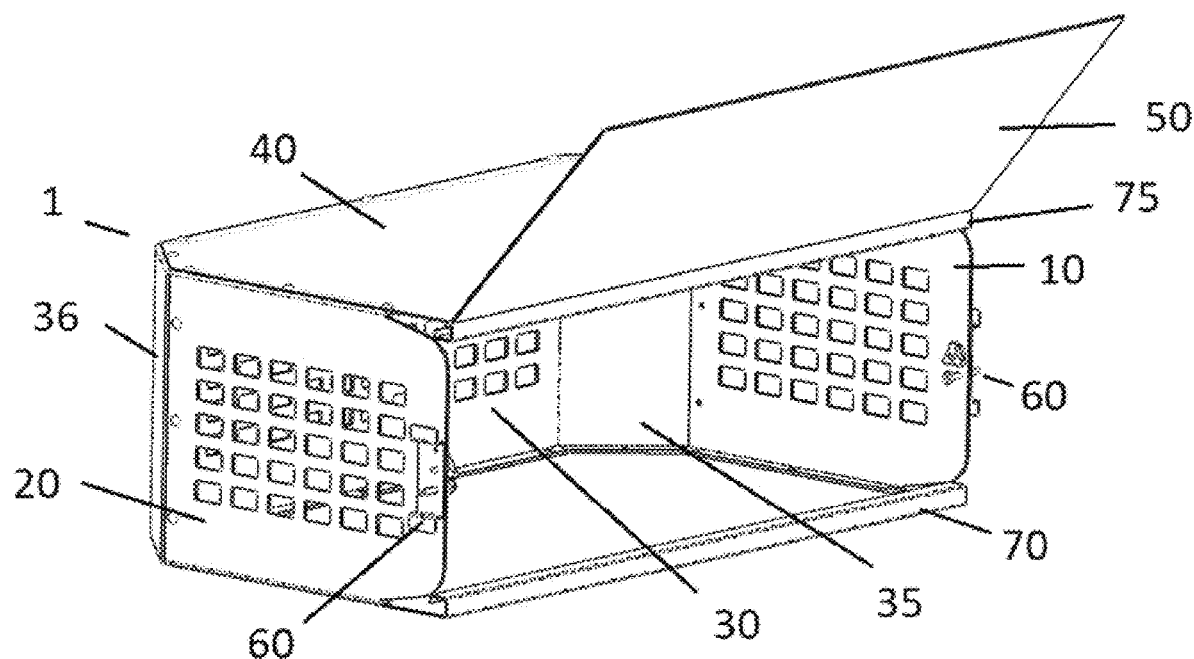
FIG. 1 is a display of the device that can be placed in a vehicle is the hinged side open.

FIG. 1 shows the device 1 which is in this view has a left side molle panel 20, a right side molle side panel 10, one back molle panel 30 with angled sides 35, 36 with a solid top 40 and bottom 70 with a hinged opening panel 50, which can serve as a trunk in a bed of a pickup truck 100 or SUV.

Figure 2:
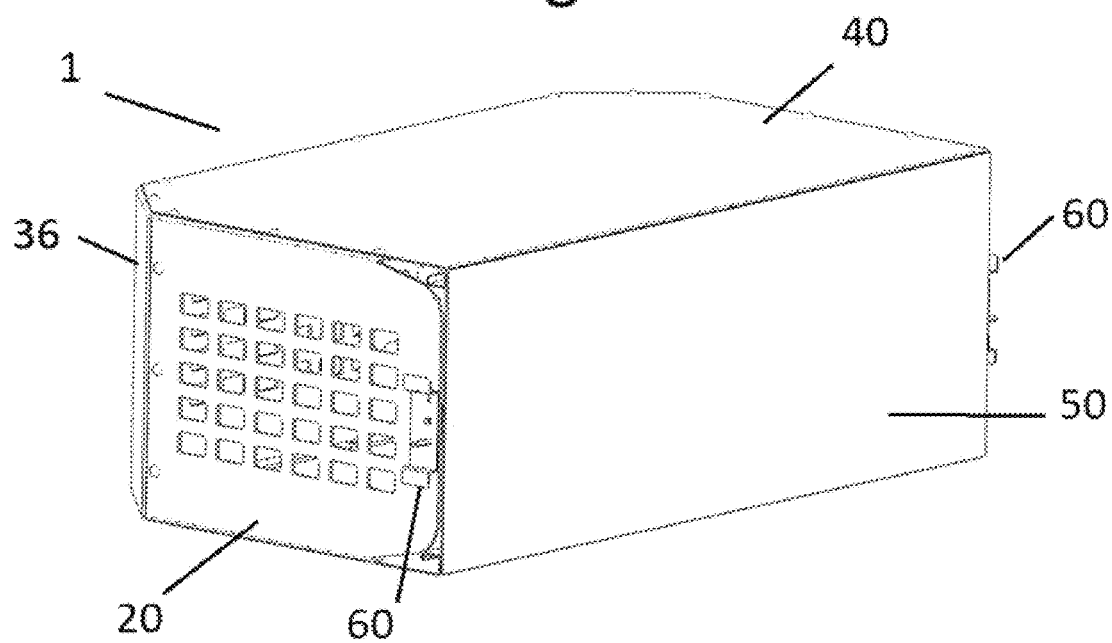
FIG. 2 is a display of the device with the hinged side closed.
Figure 3:
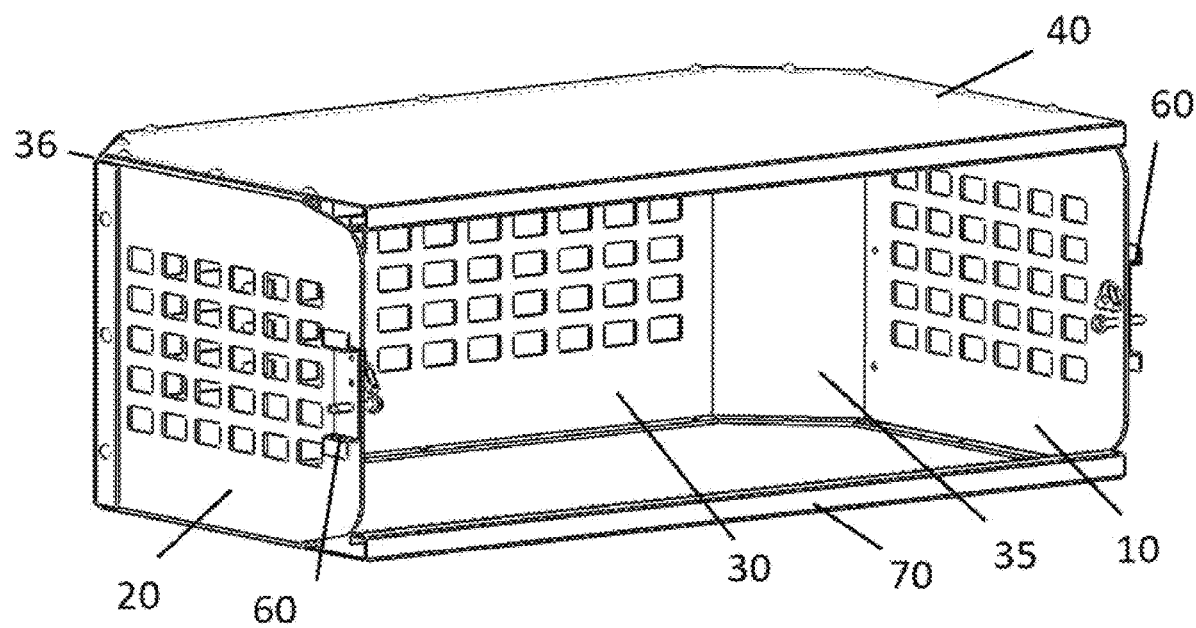
FIG. 3 shows a view of the device with an open side.
Figure 4:
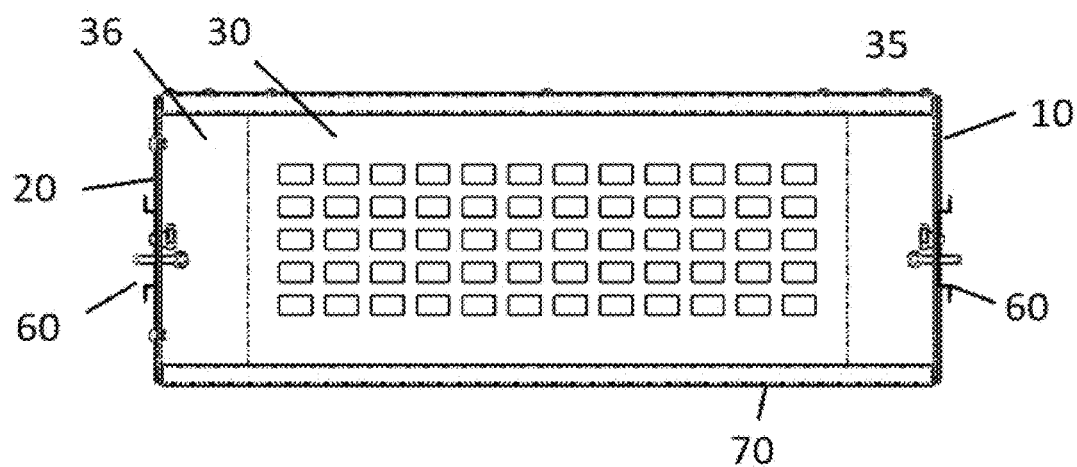
FIG. 4 is a view looking into the open cavity of the device.

FIG. 2 shows the device with the hinged opening panel 65 in a closed position. FIG. 3 shows the device 1 without a hinged opening panel. It shows the pivot pens 60 on the two molle sides 10, 20 while FIG. 4 shows a straight on view of the device 1 in its trunk configuration.

The panels are rectangular in shape. The left side molle panel 20, a right side molle side panel 10 may have tampered rounded edges in the front. This eliminates sharp edges making the device 1 safer.

Figure 5:
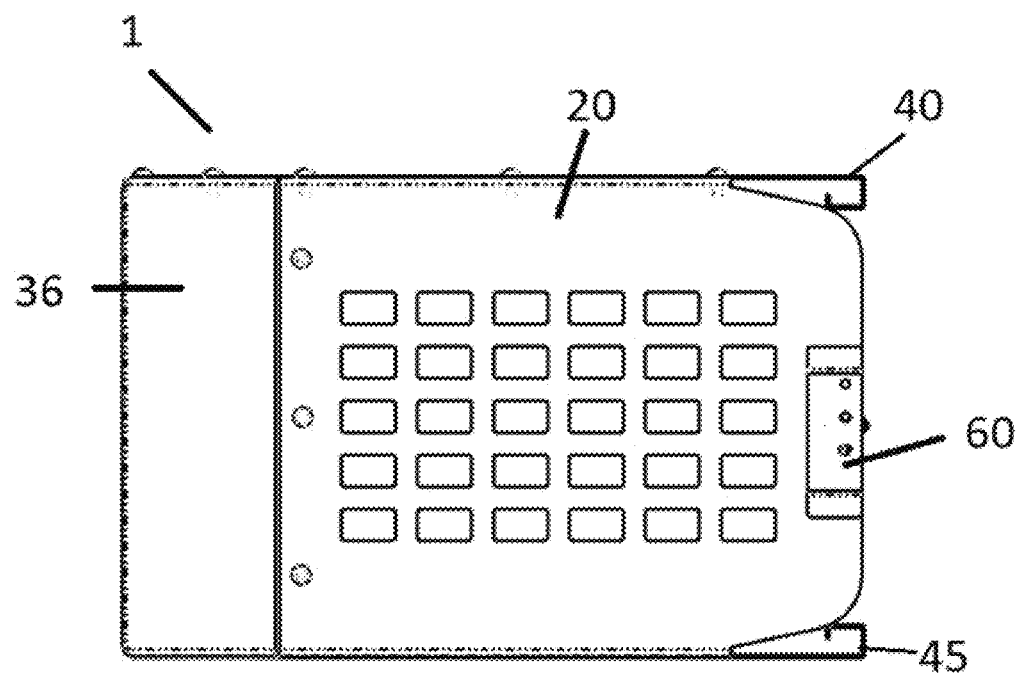
FIG. 5 shows a side view of the device.
Figure 6:
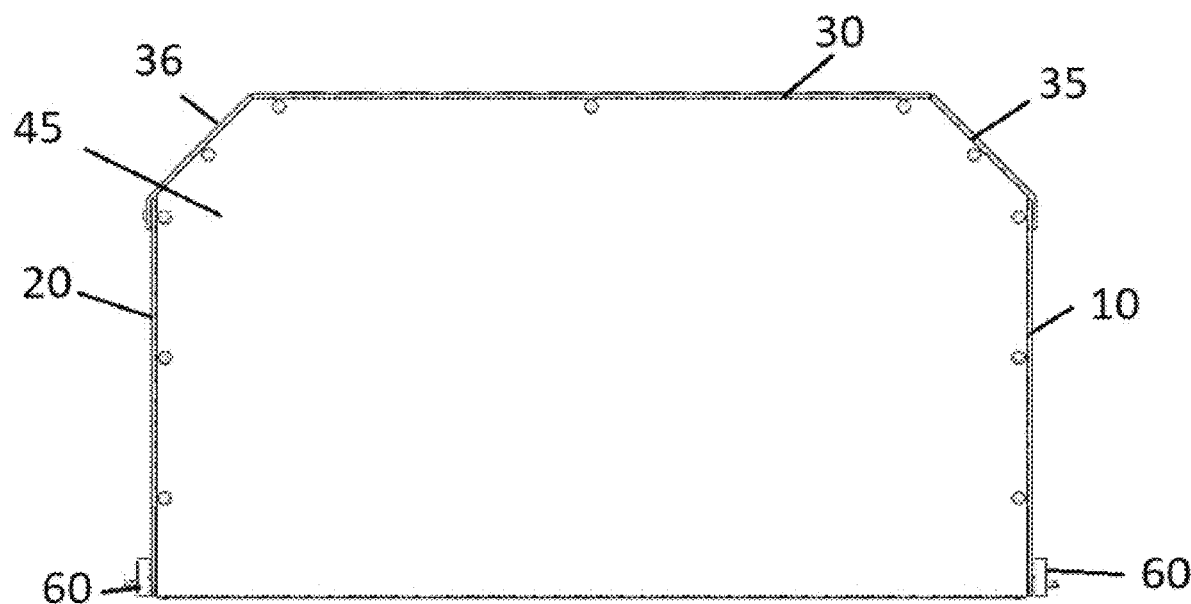
FIG. 6 shows a solid panel (top/bottom) view of the device.
Figure 7:
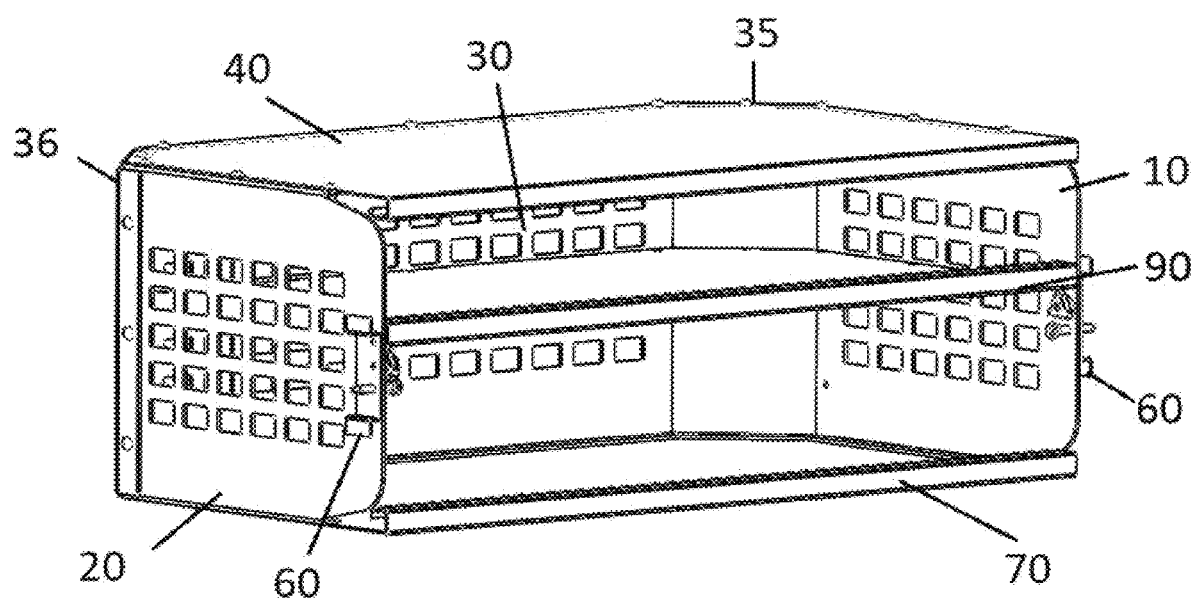
FIG. 7 show a view of the device with shelves.

FIG. 5 shows a view of the left molle side 20 with the right molle side 10 bring a mirror image thereof. FIG. 6 shows a view of the bottom panel 70. FIG. 7 shows the configuration with a shelf 90 that is connected to the sides with a shelf bracket 95.

Figure 8:
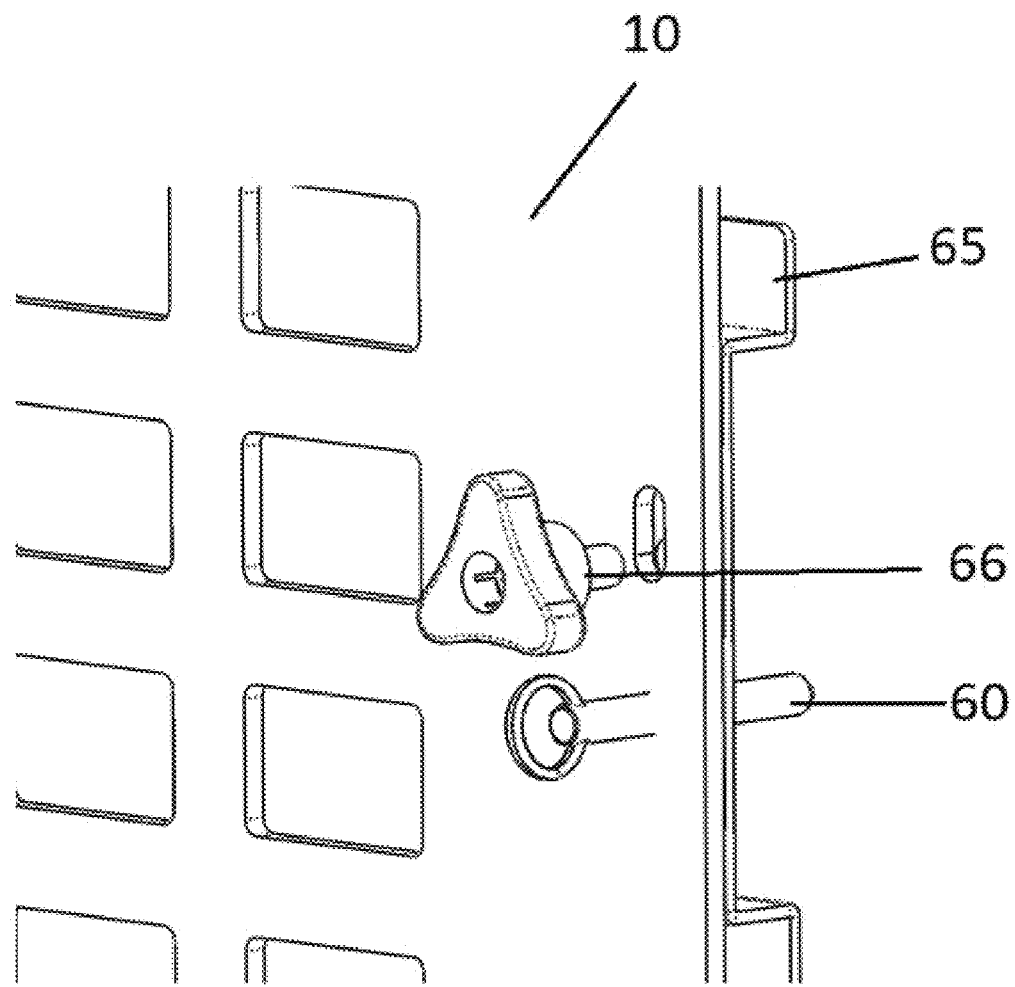
FIG. 8 shows a close-up view of the pivot pen of the device.

FIG. 8 shows a close-up view of the pivot 60 and the locking pin 66. The pivot 66 allows the device 1 to turn from a truck position to an extended position over the tailgate. The locking pin 66 locks the device 1 into place once it is placed in the desired locking. In the preferred embodiment, the lock pin 66 has a head on a treaded shaft and the is turned in a female treaded hole. The pivot bracket 65 has two extended tabs that help secure the device 1 into its proper position on the truck 100.

Figure 9:
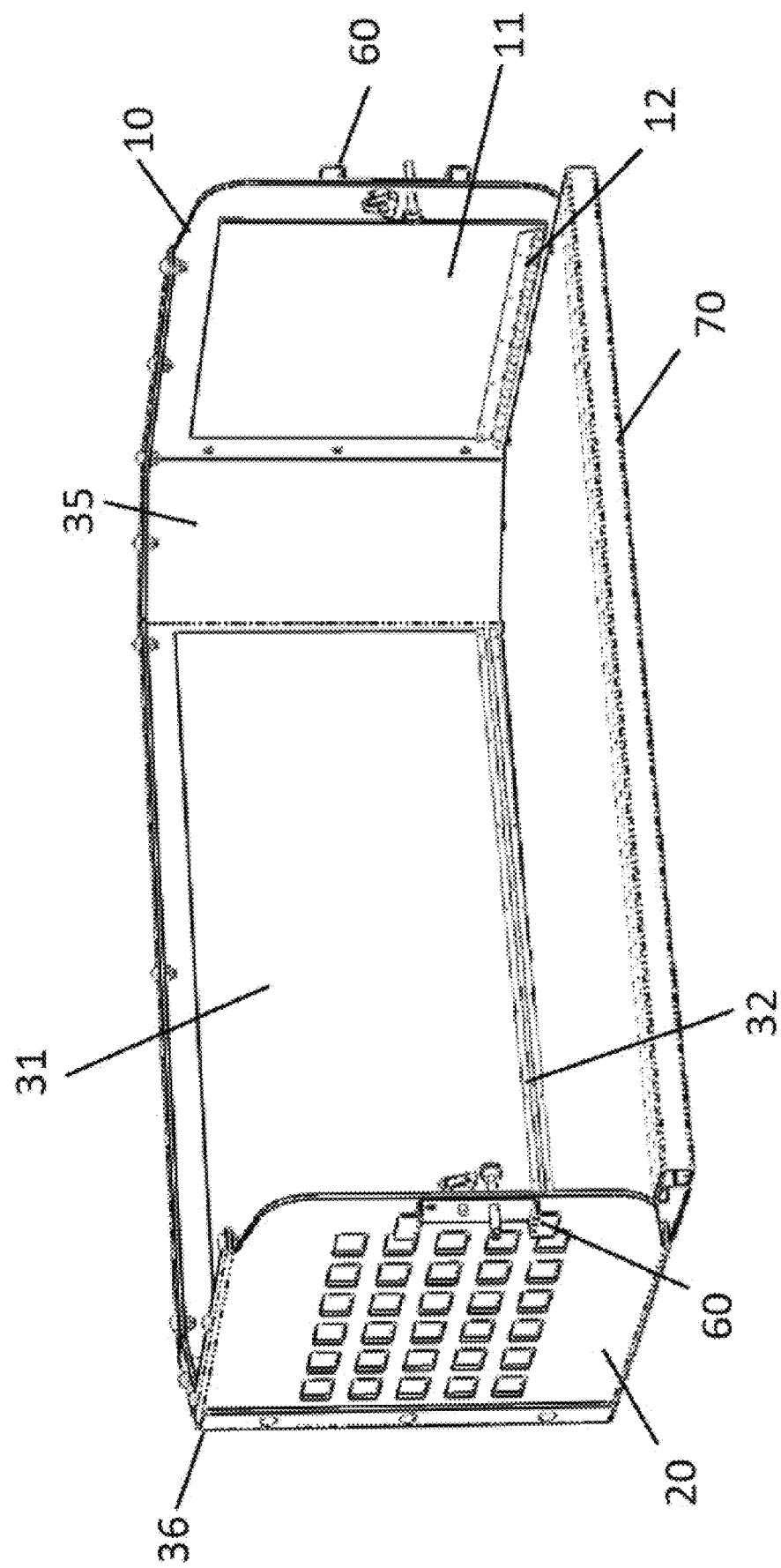
FIG. 9 shows the device with panels covering the molle boards.
Figure 10:
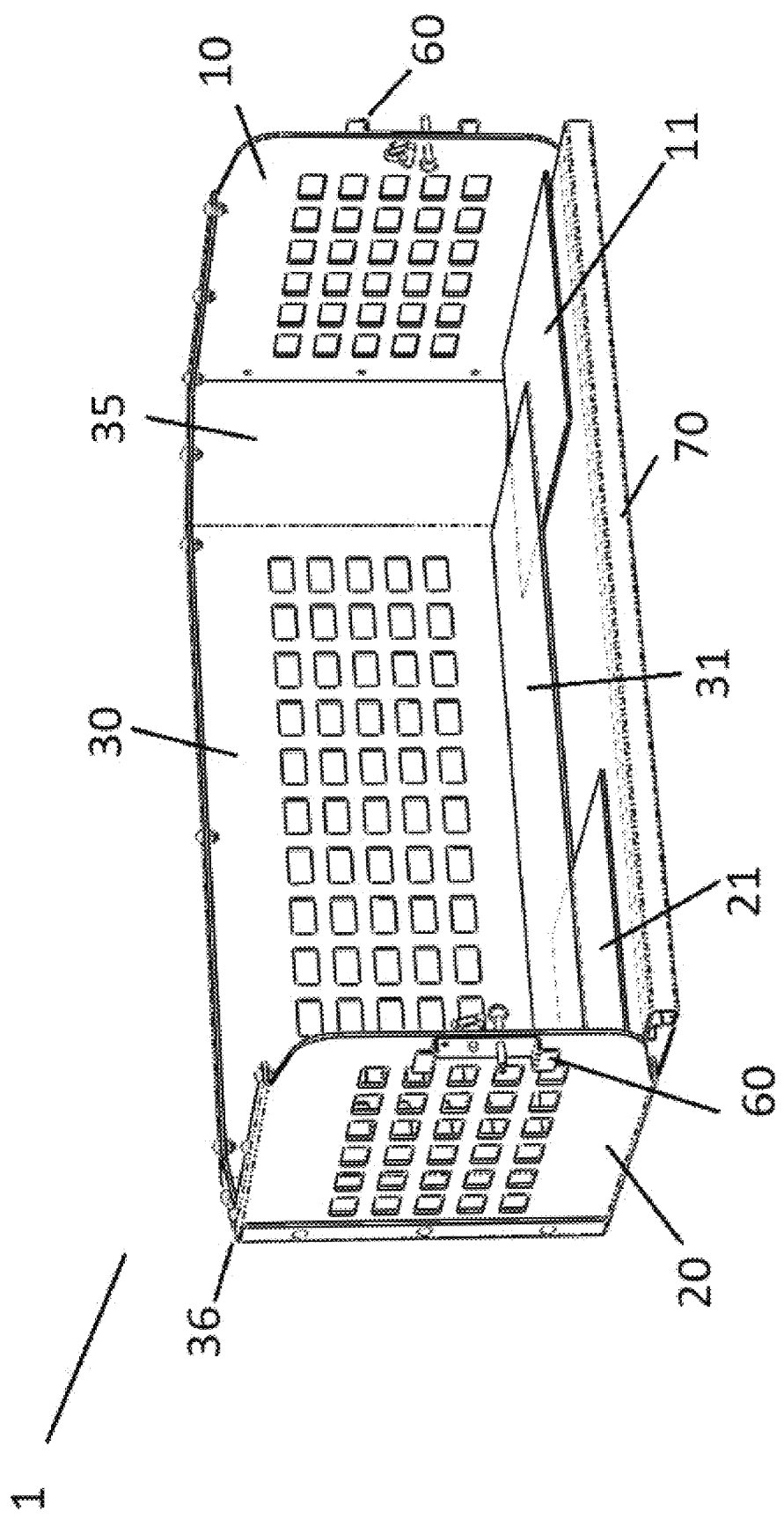
FIG. 10 shows the device with panels lying flat.

FIG. 9 shows the molle panels being covered with solid panels to make a configuration without molle holes in it. There can be one or more covers which may be connected to the hinge to the molle sides. A left side cover 21 connect to a left side hinge 22 to cover the left side molle panel 20. A right side cover 11 connect to a right side hinge 12 to cover the right side molle side panel 10. A back cover 31 connect to a back hinge 32 to cover the back molle panel 30. FIG. 10 shows the covers in a folded down position uncovering the molle boards.

Figure 11:
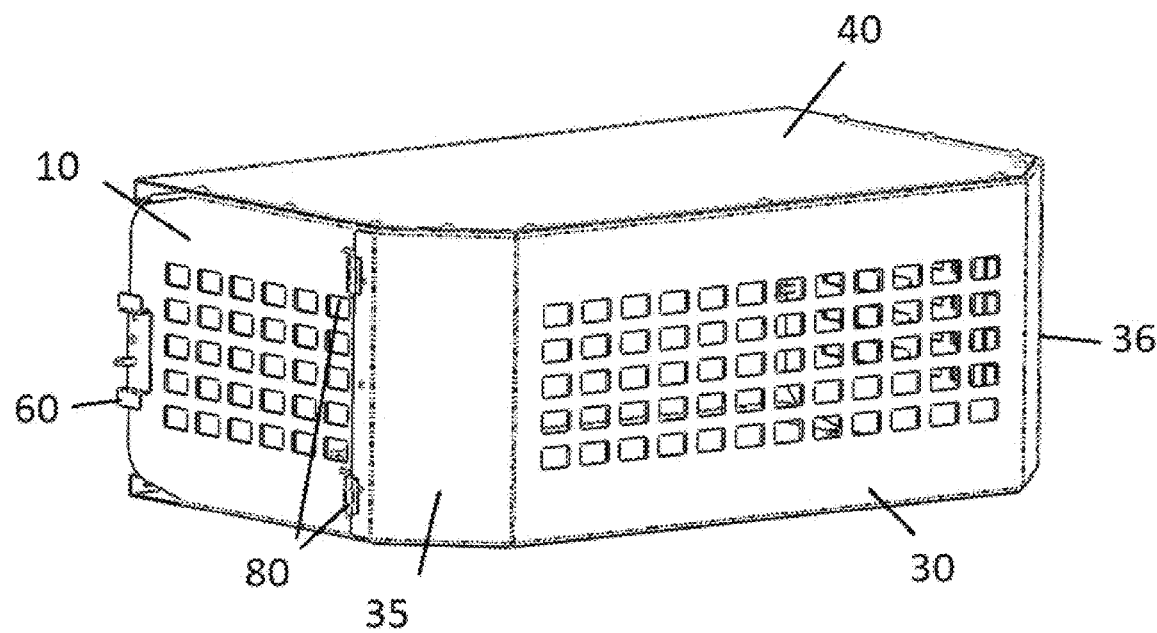
FIG. 11 shows the back molle board.
Figure 12:
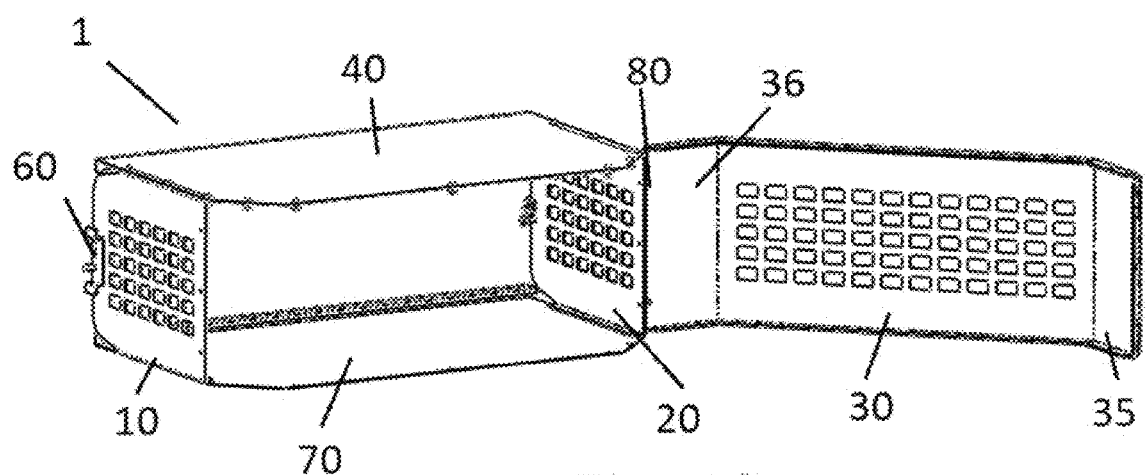
FIG. 12 shows the back molle board being opened by a hinge.

FIG. 11 shows the device 1 with the back of the device 1 being place forward with a plurality of hinged locking mechanism 80 connecting the back molle 30 to the side molle panels. It also shows the angled back side panels 35, 36 that connect the back molle panel 30 to the side molle panels 10, 20. FIG. 12 shows the side molle panels have a hinge 80 that allows the back molle panel 30 and the back side panels 35, 36 to swing open or be removed.

Figure 13:
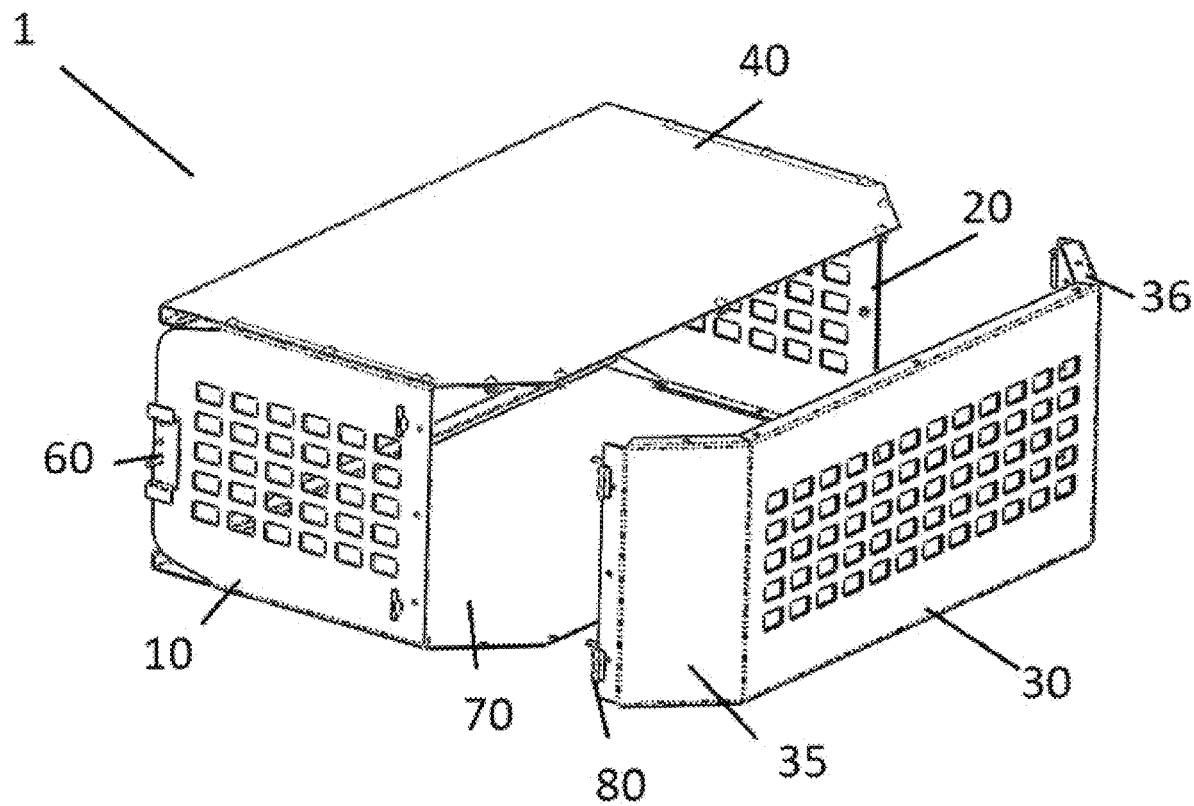
FIG. 13 shows the back mollee board being removed with a close up of the clasp holding it.
Figure 13:
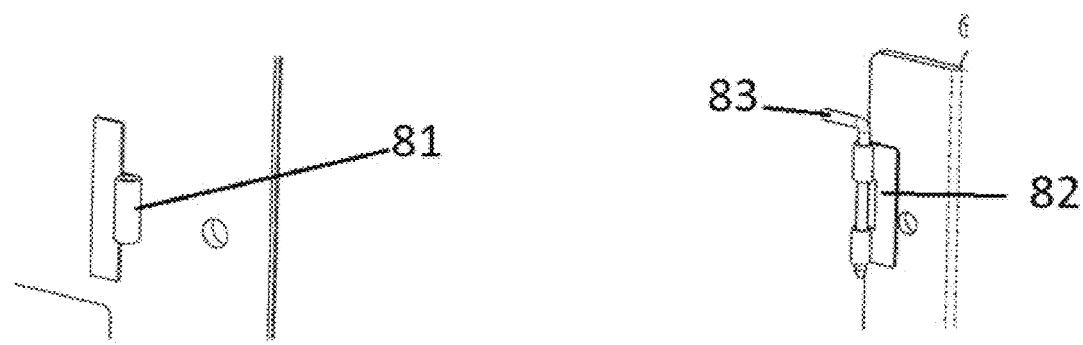
Figure 14:
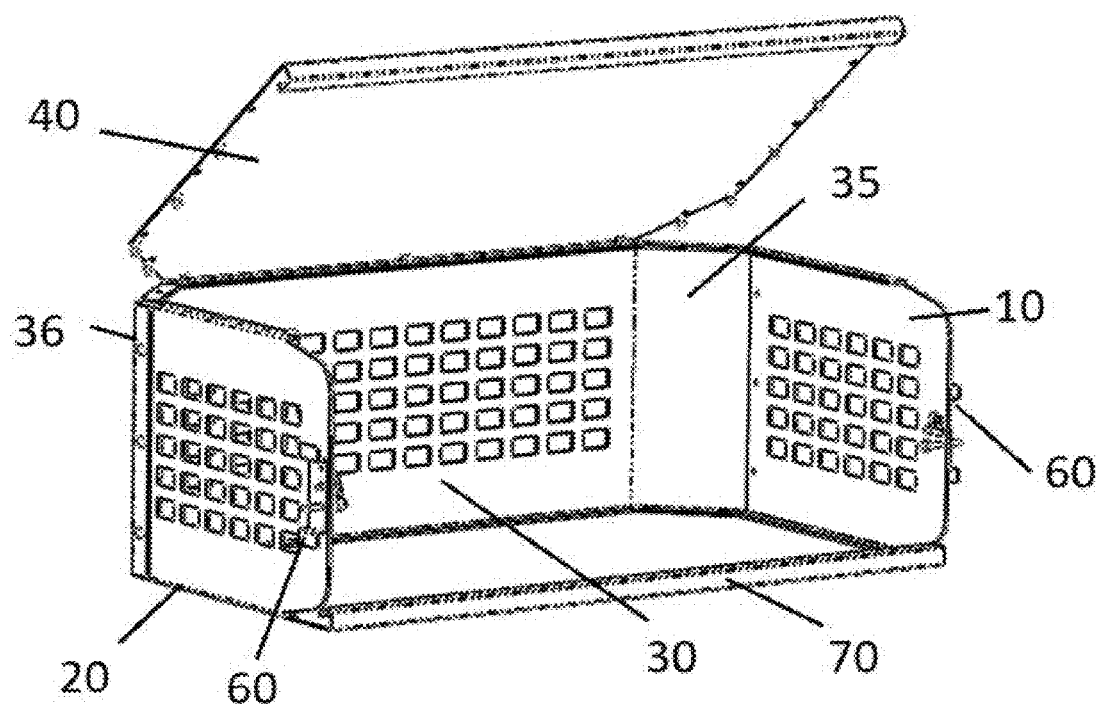
FIG. 14 shows an open device with an opened hinged top.

FIG. 13 shows a removable front molle panel with a close-up view of the disconnect able hinges. The hinge 80 is similar to a door hinge with a single cylinder on the side panel and a dual cylinder of the back side panel where the cylinders line up and a pin 85 goes through the cylinders allowing the back panels to pivot on the hinge 80 or be removed if the pin 85 on both sides are removed. The hinge 80 can also be on the top and bottom of the back 30 so the back 30 can be opened down or up, FIG. 14 shows the device 1 with a hinged top 40 and open front.

Figure 15:
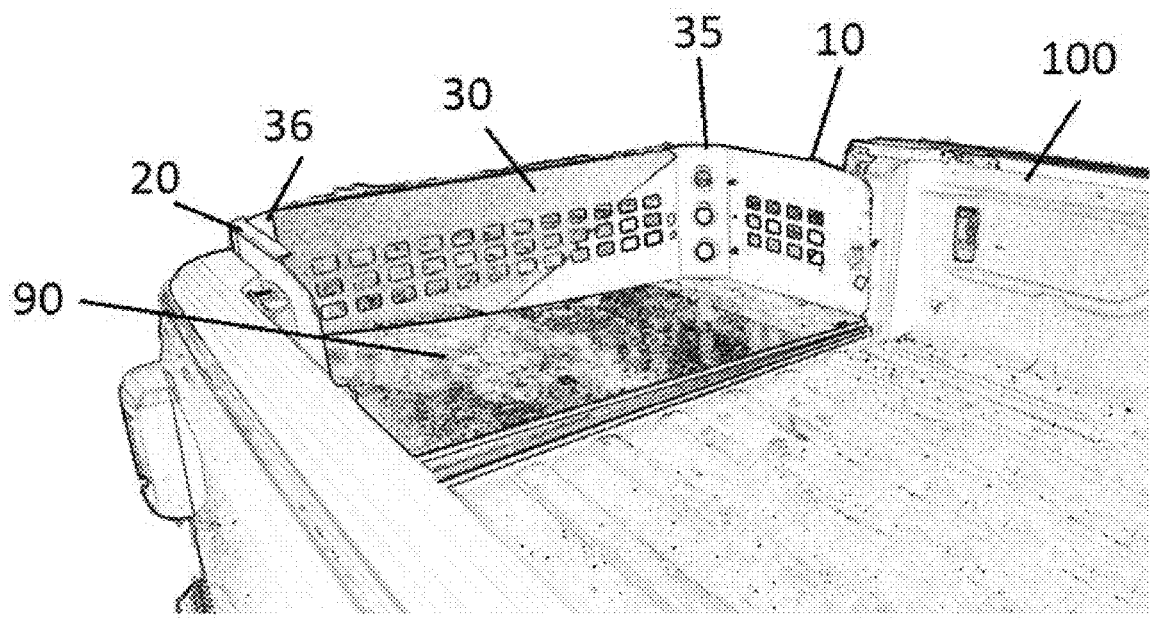
FIG. 15 shows the device being used as a bed extender.

FIG. 15 shows the device 1 in a configuration being used as an extender. The pivot 60 and locking pen 65 attach the device 1 to the tailgate door frame. FIG. 15 also shows shelves 90

Figure 16:
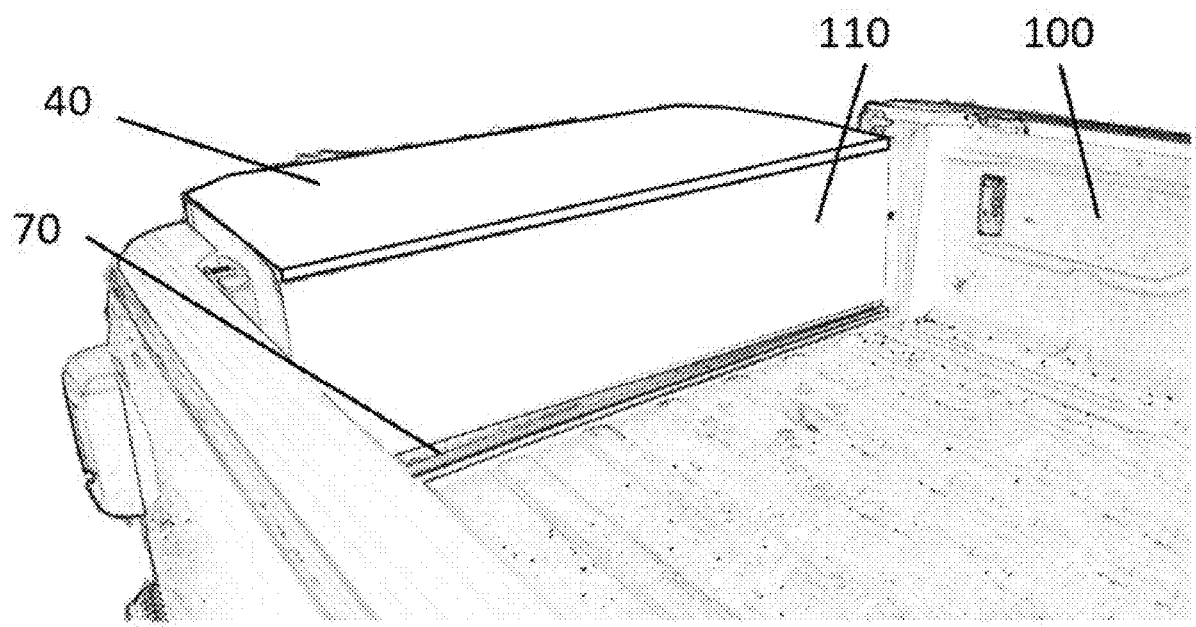
FIG. 16 shows the device as a bed extender with a solid top and back.
Figure 17:
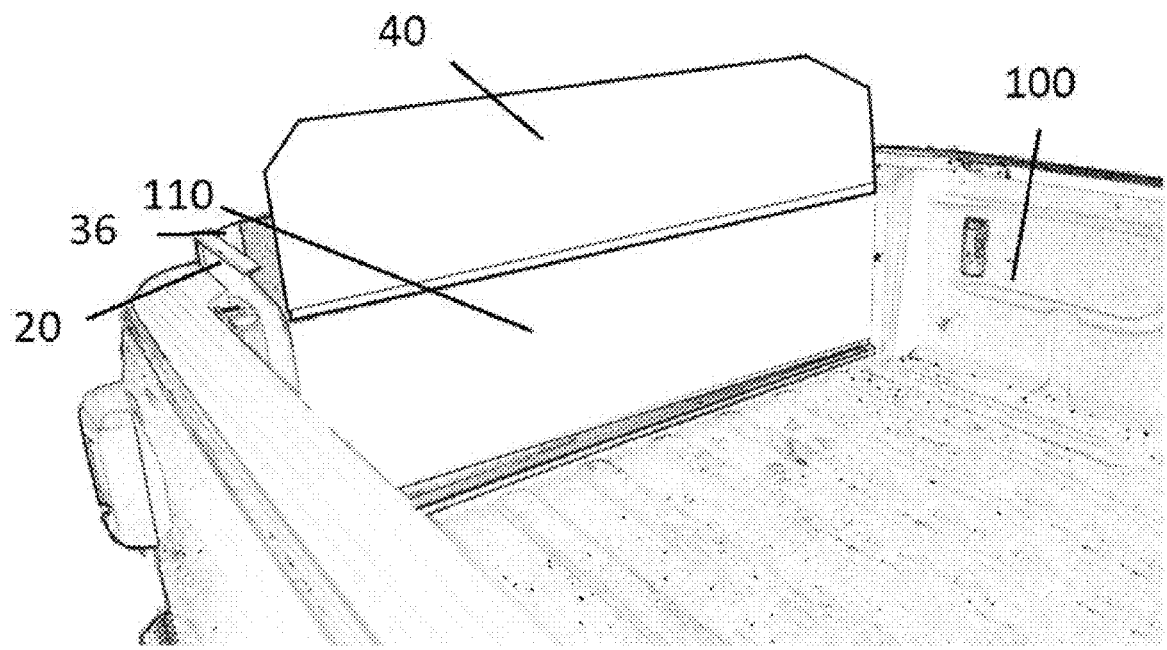
FIG. 17 shows the device as a bed extender with a solid top and back with the lid being opened.
Figure 18:
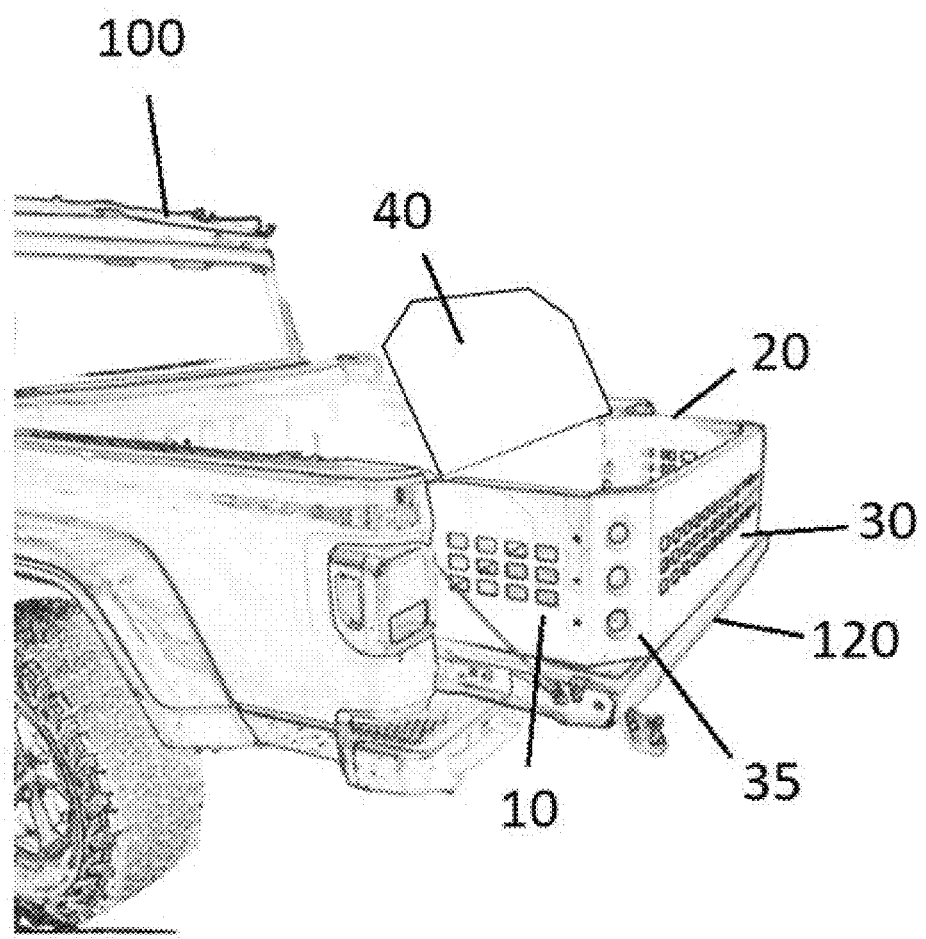
FIG. 18 shows a side view of the device as a bed extender with a solid top and back with the lid being opened.
Figure 19:
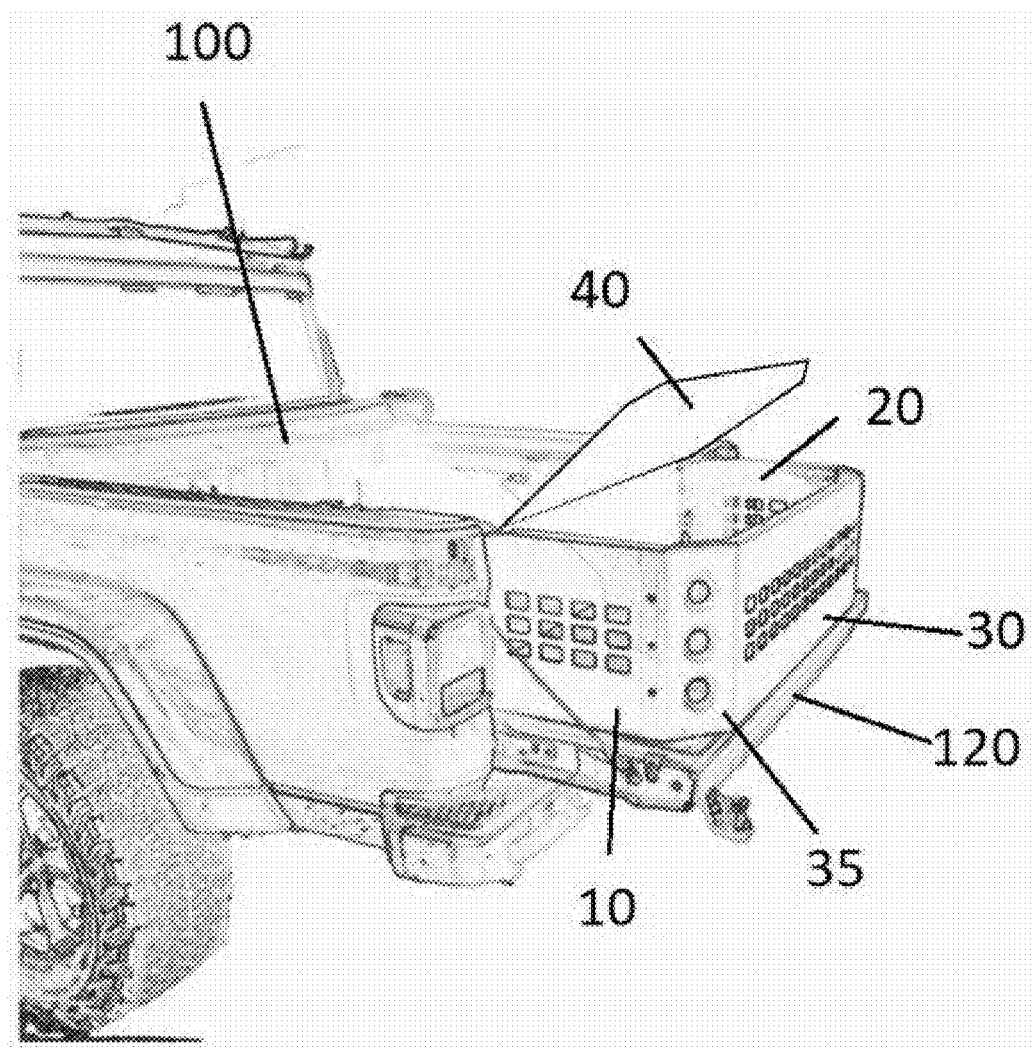
FIG. 19 shows a another side view of the device as a bed extender with a solid top and back with the lid being opened.
Figure 20:
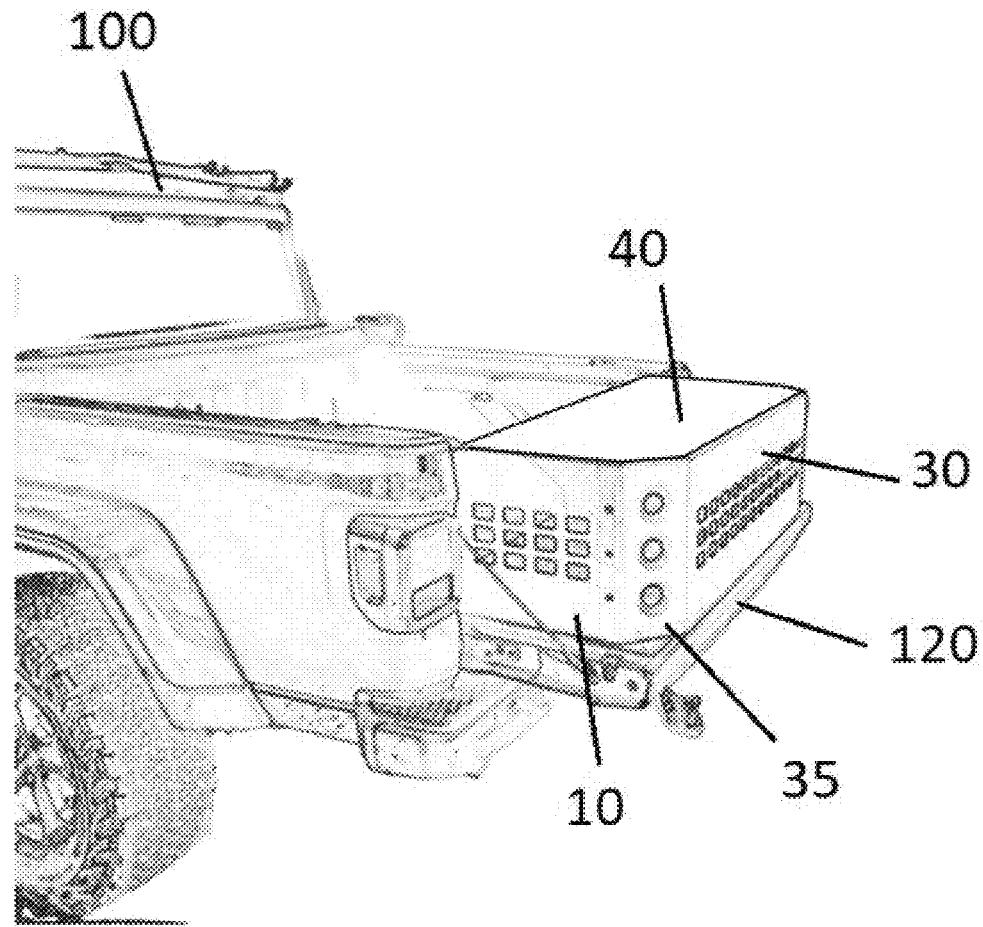
FIG. 20 shows a side view of the device as a bed extender with a solid top and back with the lid being closed.
Figure 21:
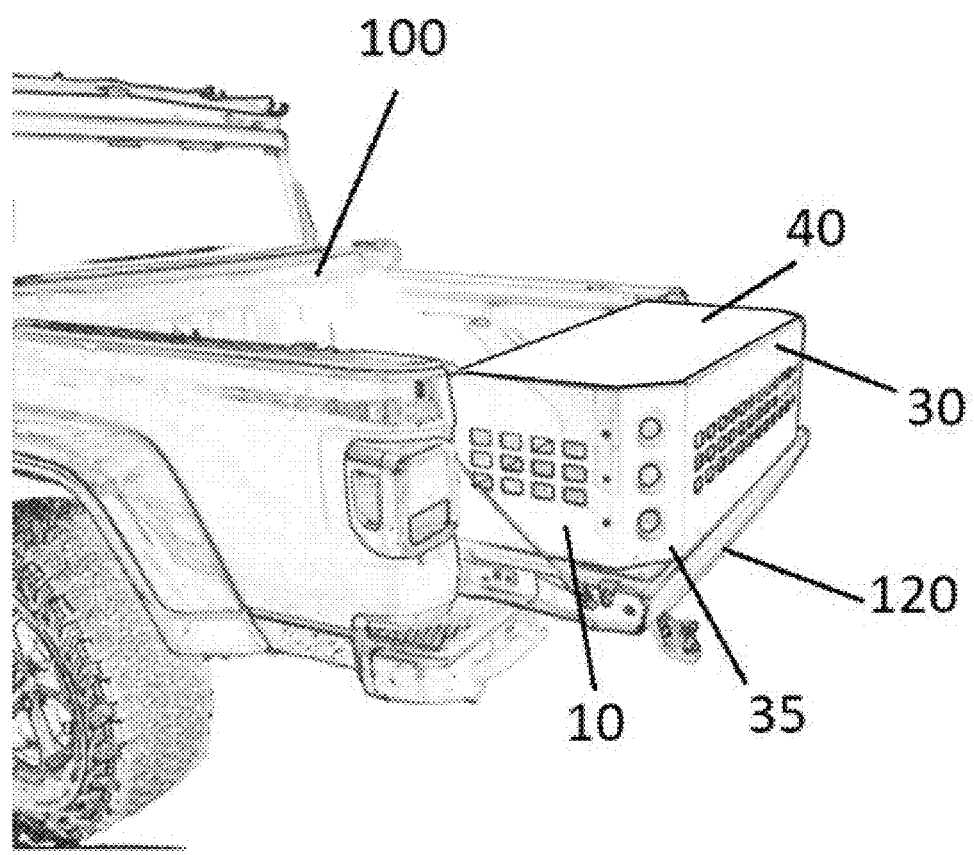
FIG. 21 shows a side view of the device as a bed extender with a solid top and back with the lid being closed.

FIG. 16 shows the device 1 being used as an extended trunk positioned on the tailgate 120 so it is serving both as a trunk and an extender. This configuration has a back 110 that faces the front of the truck 100. FIG. 17 shows the top 40 opening up in this configuration. FIG. 18 shows a side view of the configuration with molle sides 10, 20 with the lid 40 open while FIG. 19 shows the lid 40 closing. FIGS. 20 and 21 show the lid 40 completely closed.

Figure 22:
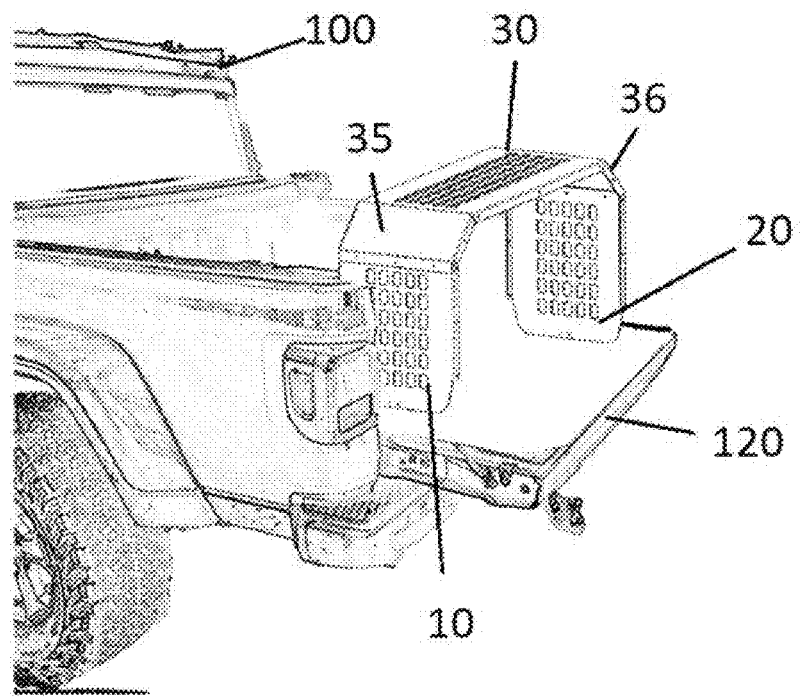
FIG. 22 shows the device being pivoted converting it form a bed extender to a trunk.
Figure 23:
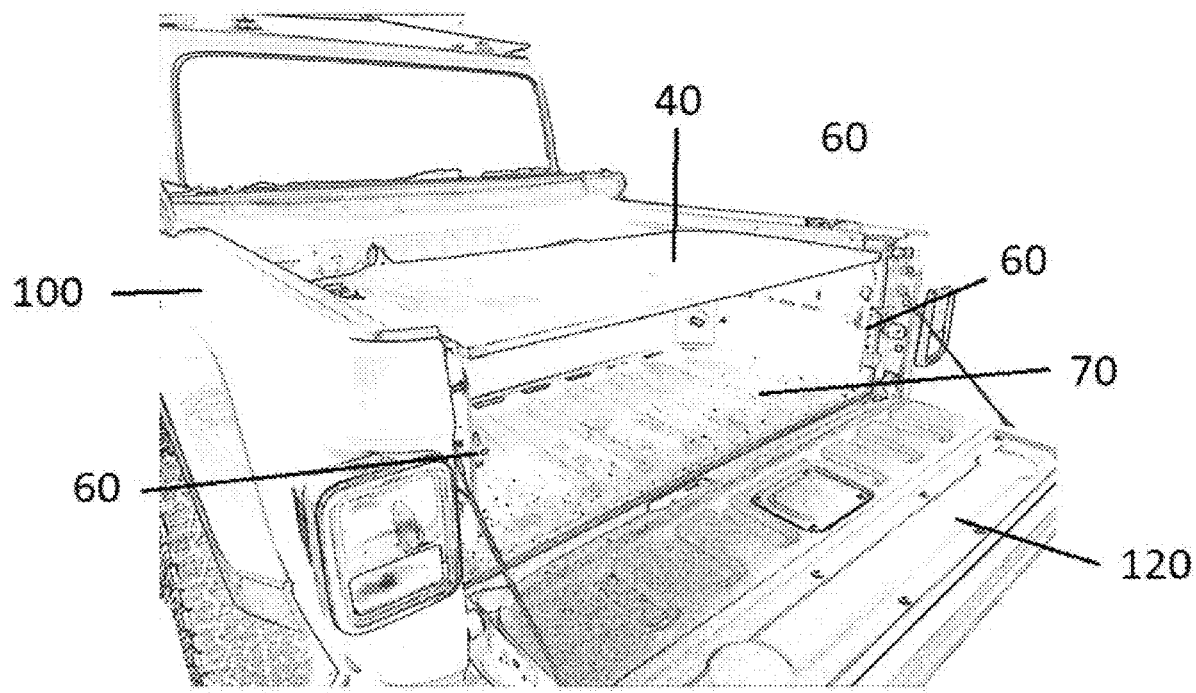
FIG. 23 shows the device being used as a trunk with the hatch being the opening.
Figure 24:
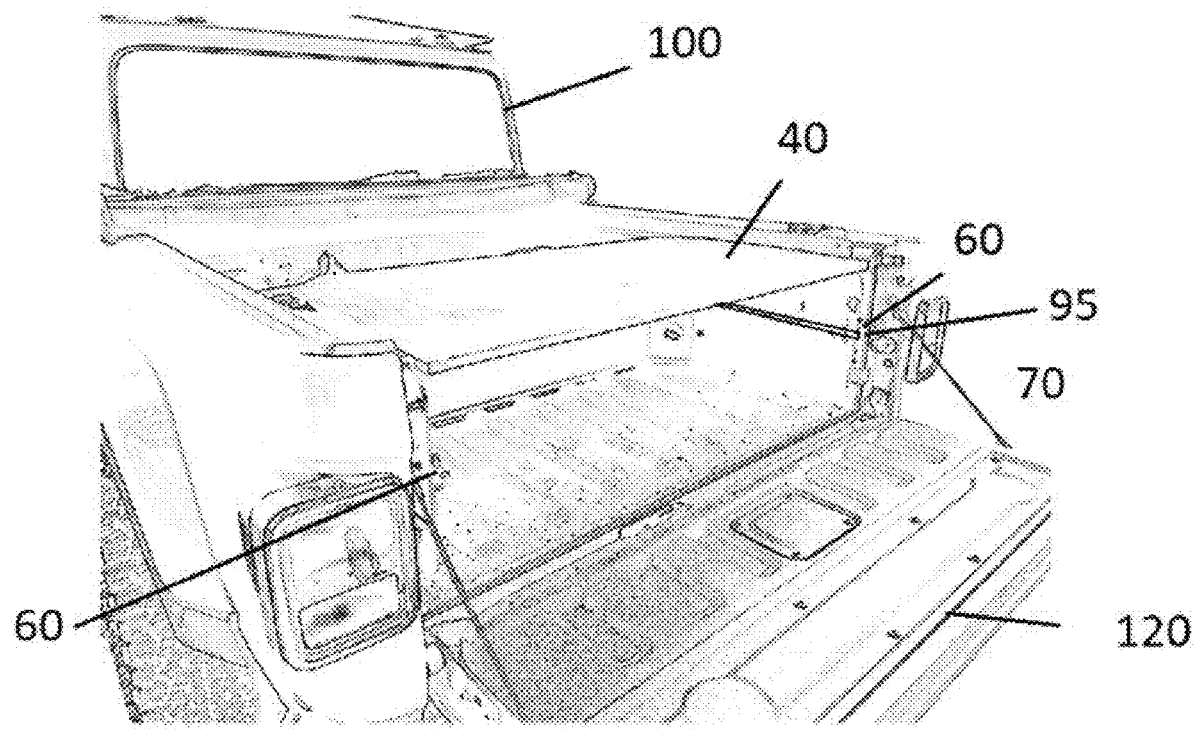
FIG. 24 shows the device being used as a trunk with the hatch being the opening.
Figure 25:
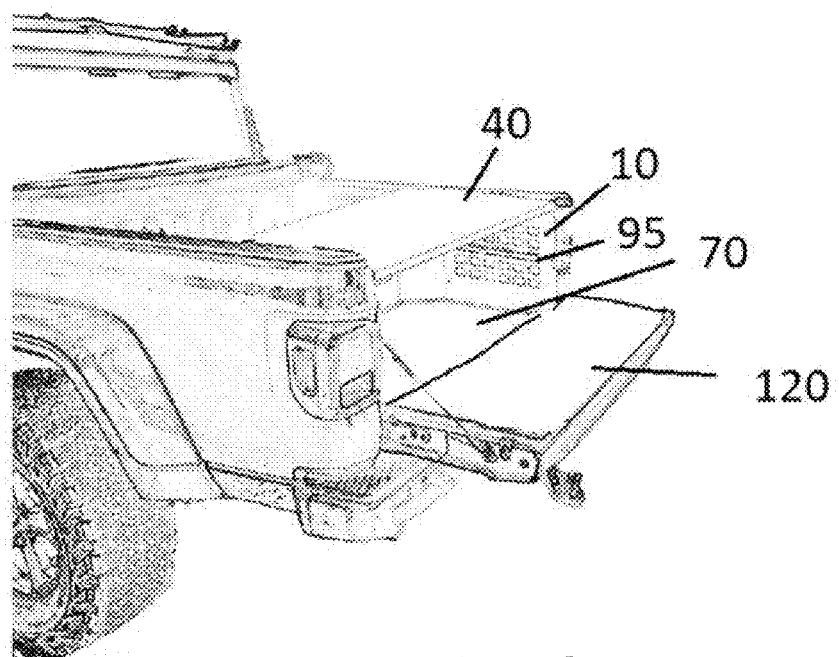
FIG. 25 shows another view of the device being used as a trunk.

FIG. 22 shows the uniqueness of the device 1. The device 1 can pivot on the pivot 60 converting it from a tailgate extender to a trunk. FIG. 23 show the device 1 after being pivoted to serve as a trunk. The device 1 can slide to different positions in the bed using the slot as shown in FIGS. 24, and 25.

The device 1 can also be slid and not just pivoted up on the tailgate as shown in FIG. 26.

FIG. 27 shows the device 1 being used as a secured trunk after it is pivoted from an extender position.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art.

What is claimed is:

1. A device that can be used as a trunk and a bed extender comprising: having frame with a left side panel with a rounded tamper front, right side panel with a rounded tamper front, a back panel with a solid top and bottom having a hinged opening panel with a hinge, having pivot pens where the pivot pens are on the two sides, where the frame can be rotated where the frame is rotated from a trunk position to an extender position, where the left side panel, the right side panel and the back panel panels are molle panels having a left side cover connected to a left side hinge to cover the left side panel, a right side cover connected to a right side hinge to cover the right side panel and a back cover connected to a back hinge to cover the back panel and where the left side and the right side cover is folded first with the back cover folded on top of the two side covers.

2. A device that can be used as a trunk and a bed extender according to claim 1 comprising: where the back panel has two angled sides.

3. A device that can be used as a trunk and a bed extender according to claim 1 comprising: having a locking pin.

4. A device that can be used as a trunk and a bed extender according to claim 1 comprising: a plurality of hinged locking mechanisms connecting the back panel to the side panels where the back panel can be swung open or be removed.

5. A device that can be used as a trunk and a bed extender according to claim 2 comprising: a plurality of locking hinges connecting the back panel to the angled sides where the back side panels and back panel can be swung open or be removed.

6. A device that can be used as a trunk and a bed extender according to claim 1 comprising: where the pivot attached the frame to a vehicle.

7. A device that can be used as a trunk and a bed extender according to claim 6 comprising: where the pivot attached the frame to a tailgate door frame.

8. A device that can be used as a trunk and a bed extender according to claim 1 comprising having pivot bracket with two extended tabs.

9. A device that can be used as a trunk and a bed extender according to claim 1 comprising: having a hinged top serving as a lid in the trunk configuration.

10. A device that can be used as a trunk and a bed extender according to claim 1 comprising: having a hinged top serving as a lid in the extender configuration.

11. A device that can be used as a trunk and a bed extender according to claim 1 comprising: having shelves.

12. A device that can be used as a trunk and a bed extender according to claim 1 comprising: where the left side cover size is smaller than the left side panel, a right side cover is smaller than the right side panel and the back cover is smaller than the back panel.

13. A device that can be used as a trunk and a bed extender according to claim 4 comprising: where the plurality of hinged locking mechanisms having a single cylinder on the side panel and a dual cylinder of the back side panel where the cylinders line up and a pin goes through the cylinders allowing the back panels to pivot on the hinged locking mechanisms or be removed if the pin on both sides are removed.

* * * * *